United States Patent
Yi et al.

(10) Patent No.: US 9,935,729 B2
(45) Date of Patent: Apr. 3, 2018

(54) SINK NODE IN A WIRELESS NETWORK EXECUTING A SLOT ASSIGNMENT METHOD BASED ON PARTITIONS

(71) Applicant: FUJITSU LIMITED, Kawasaki-shi, Kanagawa (JP)

(72) Inventors: Longteng Yi, Beijing (CN); Hao Wang, Beijing (CN); Xiaojing Fan, Beijing (CN); Jun Tian, Beijing (CN); Taiji Kondo, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 455 days.

(21) Appl. No.: 14/524,369

(22) Filed: Oct. 27, 2014

(65) Prior Publication Data

US 2015/0117257 A1    Apr. 30, 2015

(30) Foreign Application Priority Data

Oct. 28, 2013    (CN) .......................... 2013 1 0516596

(51) Int. Cl.
H04W 74/08    (2009.01)
H04L 1/00    (2006.01)
(Continued)

(52) U.S. Cl.
CPC ............. *H04L 1/00* (2013.01); *H04W 40/246* (2013.01); *H04W 40/248* (2013.01);
(Continued)

(58) Field of Classification Search
CPC ............. H04W 40/246; H04W 28/044; H04W 28/046; H04W 74/085; H04W 74/0858; H04L 12/44; H04L 41/0636
See application file for complete search history.

(56) References Cited

U.S. PATENT DOCUMENTS

2002/0075941 A1* 6/2002 Souissi .................. H04B 1/715
                                                                    375/133
2008/0112387 A1* 5/2008 Gandham ........... H04L 12/1881
                                                                    370/345
(Continued)

FOREIGN PATENT DOCUMENTS

CN    101179410    5/2008
CN    101237366    8/2008
(Continued)

OTHER PUBLICATIONS

Chinese Office Action dated Aug. 22, 2017 in Chinese Patent Application No. 201310516596.6.

*Primary Examiner* — Salvador E Rivas
(74) *Attorney, Agent, or Firm* — Staas & Halsey LLP

(57) ABSTRACT

A partition based slot assignment method and apparatus, applying to other nodes than a sink node in a multi-hop sensor network including: transmitting a detection request packet including subtree information of a subtree of the sink node, using a node one-hop away as a root node; determining whether other nodes and the sink node are in the same subtree according to received detection request packets transmitted by other nodes including subtree information of subtrees of the other nodes; and storing the subtree information of the subtrees of other nodes in a local collision table if the other nodes and sink node are not in a same subtree, and transmitting the table to a parent node of the sink node. By changing a slot assignment in a larger network into independent slot assignments in smaller networks, a slot assignment problem resulting from a large number of nodes may be solved.

6 Claims, 11 Drawing Sheets

(51) Int. Cl.
  *H04W 40/24*    (2009.01)
  *H04W 28/06*    (2009.01)
  *H04W 72/04*    (2009.01)
  *H04W 84/18*    (2009.01)
  *H04W 40/32*    (2009.01)
  *H04L 12/753*   (2013.01)

(52) U.S. Cl.
  CPC ........... *H04W 74/085* (2013.01); *H04L 45/48* (2013.01); *H04W 28/06* (2013.01); *H04W 40/32* (2013.01); *H04W 72/0446* (2013.01); *H04W 84/18* (2013.01)

(56) References Cited

U.S. PATENT DOCUMENTS

2012/0155463 A1    6/2012    Vasseur et al.
2015/0049644 A1*    2/2015    Lee ................... H04W 72/0446
                                                             370/256

FOREIGN PATENT DOCUMENTS

| CN | 101938805 | 1/2011 |
| CN | 101977414 | 2/2011 |
| CN | 102036419 | 4/2011 |

* cited by examiner

--Prior Art--

--Prior Art--

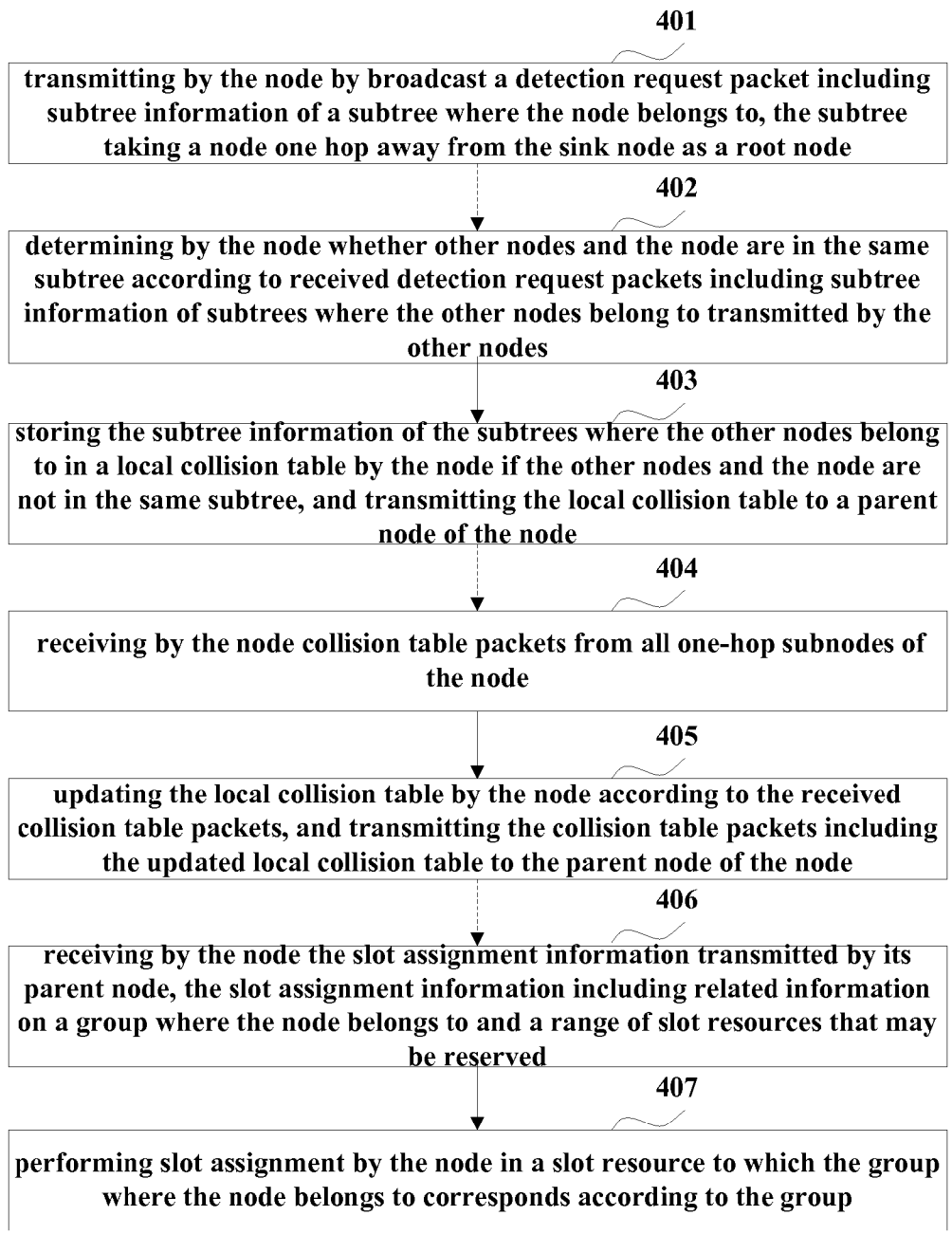
FIG.4
| type | source address | destination address | root ID |
FIG.5
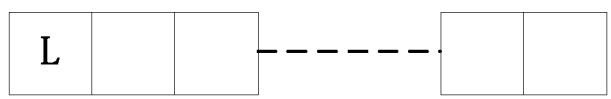
FIG.6

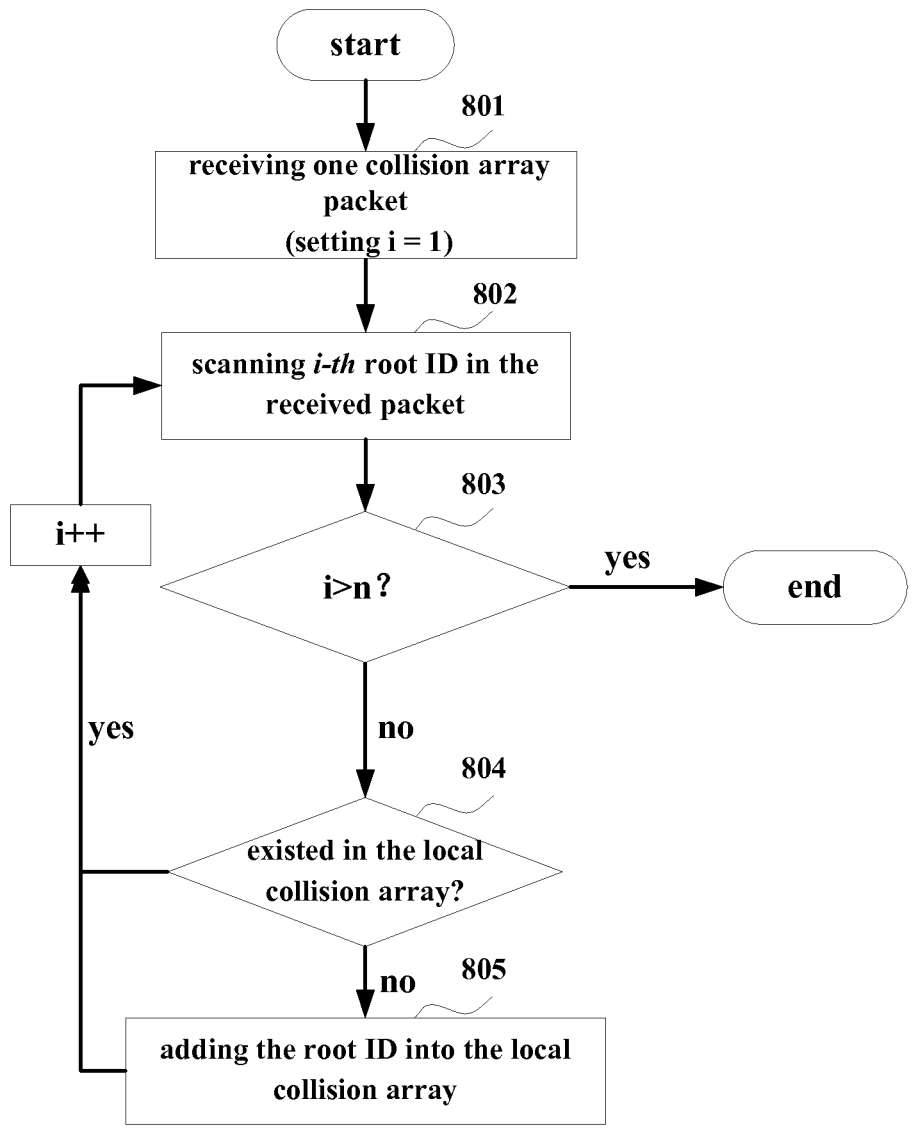

SINK NODE IN A WIRELESS NETWORK EXECUTING A SLOT ASSIGNMENT METHOD BASED ON PARTITIONS

CROSS-REFERENCE TO RELATED APPLICATION(S)

This application claims the benefit of Chinese Application No. 201310516596.6, filed Oct. 28, 2013, the disclosure of which is incorporated herein by reference.

TECHNICAL FIELD

The present invention relates to the field of communications, and in particular to a slot assignment method and apparatus based on partition.

BACKGROUND

In a wireless sensor network, if neighboring nodes transmit data packets of their own at the same time, collision will occur. As shown in FIG. 1, a node A and a node C occupy identical slot to transmit data packets of their own. And as for a neighboring node B, as it receives data packets at this slot, obvious collision is produced.

Currently, in order to overcome such collision, a slot assignment method is used, so as to ensure that neighboring nodes transmit data packets of their own at different slots. As shown in FIG. 2, a node A transmits its data packets at a slot n, a node C transmits its data packets at a slot m, and as for a neighboring node B, it receives data packets transmitted by the node A and the node C at different slots. So transmission collision may be avoided, and fewer packets will be dropped, a higher delivery ratio will be achieved.

However, in the implementation of the present invention, the inventors found that the larger a network is, the more difficult the slot assignment is. Among so many nodes, for one slot, determination about which node may reserve the slot becomes more complicated, meanwhile, the negotiation overhead (for example, a size of a local table in one node and a size of a control packet) is large. How to mitigate such a problem becomes a direction of study in the industry.

It should be noted that the above description of the background art is merely provided for clear and complete explanation of the present invention and for easy understanding by those skilled in the art. And it should not be understood that the above technical solution is known to those skilled in the art as it is described in the background art of the present invention.

SUMMARY

A main object of embodiments of the present invention is to provide a slot assignment method and apparatus based on partition. By changing slot assignment in a relatively large network into several independent slot assignment (spatially and temporally) in several relatively small networks, the problem mentioned in the Background Art may be solved.

According to a first aspect of the embodiments of the present invention, there is provided a slot assignment method based on partition. Wherein, the method is applicable to other nodes than a sink node in a multi-hop sensor network and includes:

transmitting by a node by broadcast a detection request packet including subtree information of a subtree where the node belongs to, the subtree taking a node one-hop away from the sink node as a root node;

determining by the node whether other nodes and the node are in the same subtree according to received detection request packets including subtree information of subtrees where the other nodes belong to transmitted by the other nodes; and storing the subtree information of the subtrees where the other nodes belong to in a local collision table by the node if the other nodes and the node are not in the same subtree, and transmitting the local collision table to a parent node of the node.

According to a second aspect of the embodiments of the present invention, there is provided a slot assignment method based on partition. Wherein, the method is applicable to a sink node in a multi-hop sensor network and includes:

determining collision relationship between subtrees according to received collision table packets from all one-hop subnodes of the sink node; and dividing all subtrees into a plurality of groups, taking subtree as a unit, according to the collision relationship, the plurality of groups being present in identical or different rounds, so that each node performs slot assignment in a slot resource to which a group where the node belongs to corresponds.

According to a third aspect of the embodiments of the present invention, there is provided a node in a wireless network, comprising:

a transmitting unit configured to transmit by broadcast a detection request packet including subtree information of a subtree where the node belongs to, the subtree taking a node one hop away from a sink node as a root node;

a determining unit configured to determine whether other nodes and the node are in the same subtree according to received detection request packets including subtree information of subtrees where the other nodes belong to transmitted by the other nodes; and a processing unit configured to store the subtree information of the subtrees where the other nodes belong to in a local collision table when the other nodes and the node are not in the same subtree, and transmit the local collision table to a parent node of the node.

According to a fourth aspect of the embodiments of the present invention, there is provided a sink node in a wireless network, including:

a determining unit configured to determine collision relationship between subtrees according to received collision table packets from all one-hop subnodes of the sink node; and a processing unit configured to, taking subtree as a unit, divide all subtrees into a plurality of groups, according to the collision relationship, the plurality of groups being present in identical or different rounds, so that each node performs slot assignment in a slot resource to which a group where the node belongs to corresponds.

According to a further aspect of the present invention, there is provided a network, including at least one node as described in the third aspect and sink node as described in the fourth aspect.

An advantage of the embodiments of the present invention resides in that by changing slot assignment in a relatively large network into several independent slot assignment (spatially and temporally) in several relatively small networks, the problem mentioned in the Background may be solved.

With reference to the following description and drawings, the particular embodiments of the present invention are disclosed in detail, and the principle of the present invention and the manners of use are indicated. It should be understood that the scope of the embodiments of the present invention is not limited thereto. The embodiments of the present invention contain many alternations, modifications and equivalents within the spirits and scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are described herein to provide further understanding of the embodiments of the present invention, which constitute a part of this application, illustrate modes of implementation of the present invention, and explain principles of the present invention together with literal description. It is obvious that accompanying drawings in the following description are some the embodiments of the present invention, and to those skilled in the art, other accompanying drawings may be obtained according to these accompanying drawings without making an inventive effort. In the drawings:

FIG. 4 is a flowchart of a slot assignment method based on partition of an embodiment of the present invention;

FIG. 5 is a schematic diagram of a format of a detection request packet;

FIG. 6 is a schematic diagram of a format of a collision array (collision table);

FIG. 7 is a schematic diagram of a format of a collision array packet (collision table packet);

FIG. 8 is a flowchart of updating a collision array;

DETAILED DESCRIPTION

Various embodiments of the present invention are described as follows with reference to the drawings. These embodiments are illustrative only, and are not intended to limit the present invention. For the principle and implementation modes of the present invention to be easily understood by those skilled in the art, the implementation modes of the present invention shall be described taking a slot assignment method based on partition in a multi-hop sensor network as an example. However, it should be understood that the embodiments of the present invention are not limited thereto, and are applicable to other networks related to slot assignment, such as an ad hoc network, and a smart power grid, etc. That is, the slot assignment method of the embodiments of the present invention may be applicable to a network with a fully-connected tree topology, and it is up to a routing algorithm to decide on which path a data packet will be transferred to the sink ("Root").

For more clarity and easy understanding of the method of the embodiments of the present invention, some concepts concerned in the embodiments of the present invention shall be explained below first.

In the embodiments of the present invention, "sink" refers to a node where all upload data are converged, which is referred to as a sink node for the convenience of explanation.

Figure 1:
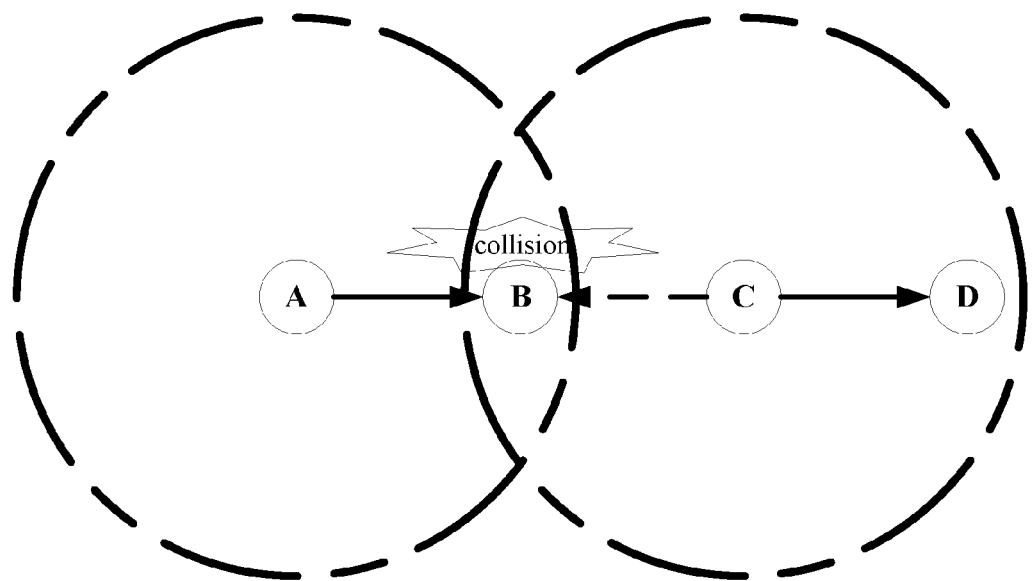
FIG. 1 is a schematic diagram of collision produced when slot assignment is not performed.
Figure 2:
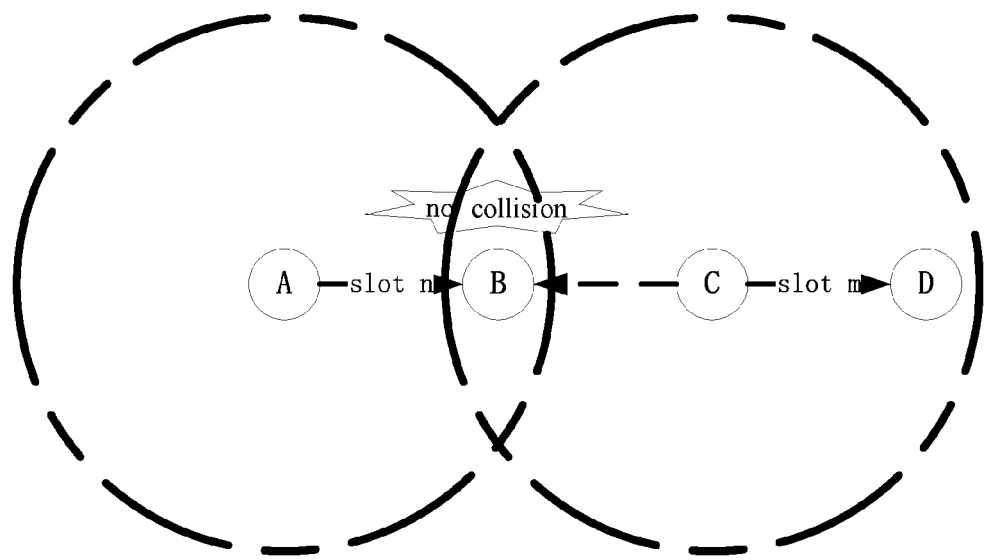
FIG. 2 is a schematic diagram of the produced collision is avoided by slot assignment.
Figure 3:
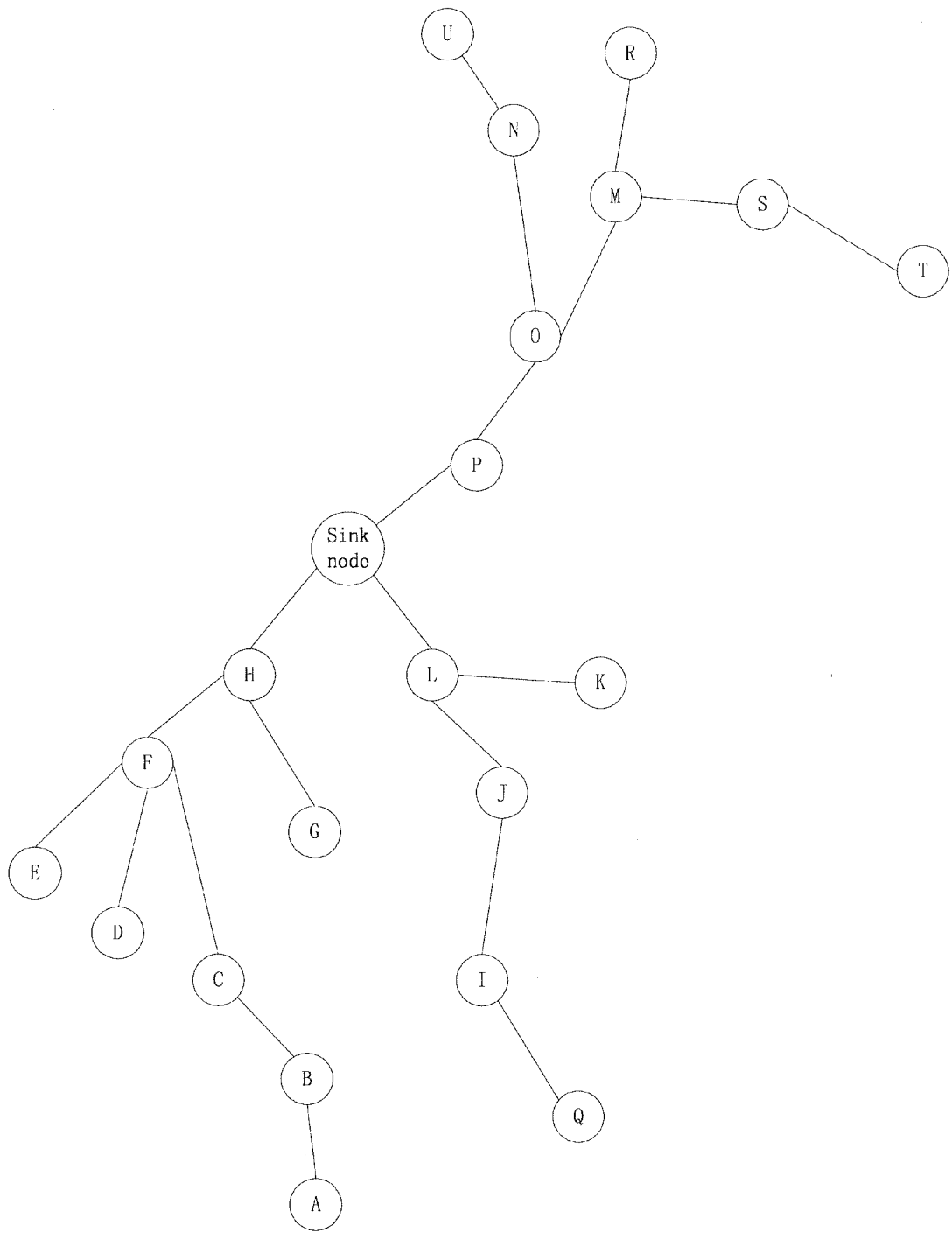
FIG. 3 is a schematic diagram of an example of topology of a wireless sensor network.

In the embodiments of the present invention, a one-hop subtree refers to a subtree taking a node one hop away from a sink node as a root; for example, subtrees taking H, L and P as roots in FIG. 3.

Embodiment 1

An embodiment of the present invention provides a slot assignment method based on partition. Wherein, the method is applicable to other nodes than a sink node in a wireless network, such as a multi-hop sensor network. FIG. 4 is a flowchart of the method. Referring to FIG. 4, the method includes:

step 401: transmitting by the node by broadcast a detection request packet including subtree information of a subtree where the node belongs to, the subtree taking a node one hop away from the sink node as a root node;

in this embodiment, assuming that a routing has been established and each node knows which one-hop subtree itself belongs to, each node performs potential collision node detection, so as to find collision relationship among each one-hop subtree; in step 401, each node issues one-hop broadcast, so that its neighboring nodes know which one-hop subtree it belongs to; FIG. 5 is a schematic diagram of an embodiment of the detection request packet (also referred to as a broadcast data packet); as shown in FIG. 5, the detection request packet mainly includes: a type, a source address, a destination address, and root ID; the root ID here refers to a root of a one-hop subtree to which the source address belongs; of course, this embodiment is not limited thereto, and the detection request packet may also include other contents and have other formats, only if a one-hop subtree to which the node belongs is indicated;

in this embodiment, as a node receiving the detection request packet, the method of this embodiment may further include:

step 402: determining by the node whether other nodes and the node are in the same subtree according to received detection request packets including subtree information of subtrees where the other nodes belong to transmitted by the other nodes; and step 403: storing the subtree information of the subtrees where the other nodes belong to in a local collision table by the node if the other nodes and the node are not in the same subtree, and transmitting the local collision table to a parent node of the node;

in this embodiment, when a node receives a detection request packet from a sender, the node will check whether itself and the sender belong to the same one-hop subtree; if they do not belong to the same one-hop subtree, that is, these two nodes cannot transmit data in parallel, the receiver will store information on different one-hop subtrees (such as the ID of the root node of the one-hop subtrees) in a collision array, which is referred to as a collision table in this embodiment, and transmit it to its parent node; for example, assuming that a node B may receive information from a node I, and the node B and the node I belong to different one-hop subtrees, a collision array in the node B is as shown in FIG. 6; where, L is a collision root node, that is, a one-hop subtree of the node I takes the node L as a root, and L is the root node of the one-hop subtree of the node I;

in this embodiment, as a node receiving the collision table packet, that is, a parent node of a node transmitting the collision table packet, the method of this embodiment further includes:

step 404: receiving by the node collision table packets from all one-hop subnodes of the node; and step 405: updating the local collision table by the node according to the received collision table packets, and transmitting the collision table packets including the updated local collision table to the parent node of the node.

In this embodiment, as a leaf node in the network has no subnode, steps 404-405 needs not be executed for these nodes, and only steps 401-403 needs to be executed. Each of other nodes than leaf nodes needs to update its collision array according to steps 404-405, and transmit the updated collision array to its parent node.

In step 404, for the local collision table to be completely updated, the node may wait for a period of time, so as to receive collision table packets from all its one-hop subnodes, and then update the local collision table according to the received collision table packets.

FIG. 7 is a schematic diagram of a format of an implementation mode of a collision table packet (also referred to as a collision array data packet). As shown in FIG. 7, the collision table packet mainly includes: a type, a source address, a destination address, and at least one root ID; wherein, the root ID is the ID of a root node of a subtree where a collision node of the node belongs to, and the at least one root ID is the above-described collision table (collision array). Of course, the collision table packet of this embodiment is not limited to the format of the collision table packet and the contained contents shown in FIG. 7, and the collision table packet may also include other contents and may be in other formats, only if which one-hop subtrees colliding with the one-hop subtree to which the node belongs are indicated.

In step 405, the node may update the local collision table by traversing each piece of subtree information (i.e. the above-described root ID) in each of the received collision table packets, not process the subtree information if the subtree information is included in the local collision table, and add the subtree information into the local collision table if the subtree information is not included in the local collision table, thereby achieving update of the local collision table.

In this embodiment, the above upload process runs level by level from a leaf node to the sink node. When one node receives one collision array data packet from one subnode, its flow of processing is as shown in FIG. 8.

Referring to FIG. 8, the flow includes:

step 801: receiving one collision array packet and setting i as 1;

step 802: scanning i-th root ID in the received collision array packet;

step 803: judging whether i is greater than n, n being the number of root ID included in the received collision array packet, and ending the processing if yes; otherwise, executing step 804;

step 804: judging whether the root ID is in the local collision array, not processing the root ID and proceeding with scanning next root ID if yes; otherwise, executing step 805; and step 805: adding the root ID into the local collision array, and proceeding with scanning next root ID.

Figure 9:
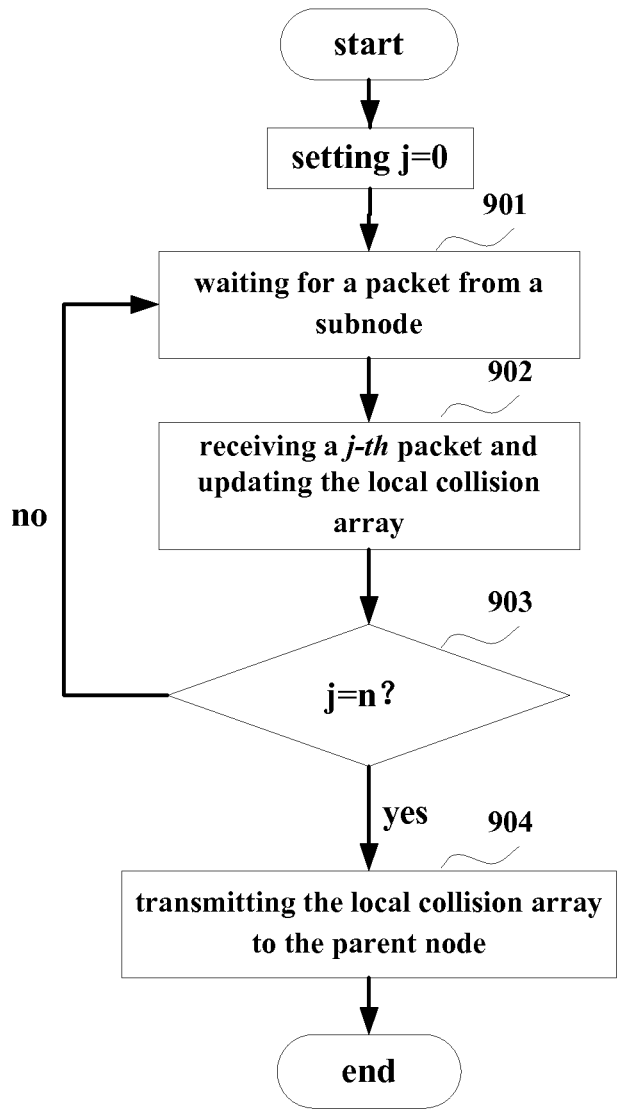
FIG. 9 is a flowchart of receiving and updating a collision array packet.

When one node received all collision array data packets from all its one-hop subnodes, the update for the collision array of the node has been completed, and the updated collision array will be uploaded to its parent node, as shown in FIG. 9.

Referring to FIG. 9, the flow includes:

step 901: waiting for a packet from a subnode (with j being set to be 0);

step 902: receiving a j-th packet and updating the local collision array;

step 903: judging whether j is equal to n, n being the number of the one-hop subnodes; and executing step 904 if yes; otherwise, turning back to step 901; and step 904: transmitting the local collision array to the parent node.

At last, the sink node will obtain a finally-updated collision array. Hence, the sink node may group all the one-hop subtrees according to the finally-updated collision array. Wherein, the sink node may distinguish any two one-hop subtrees collision-free or not (collision of two one-hop subtrees means that if two nodes in the two one-hop subtrees reserve the same slot, collision possibly occurs), and perform grouping accordingly, so as to ensure that there is no collision between one-hop subtrees of different groups at the same round. A concrete method of grouping shall be described in a following embodiment.

In this embodiment, when all the one-hop subtrees are grouped by the sink node, slot assignment information shall be transmitted downwards level by level, the slot assignment information including not only groups where the nodes belong to, but also ranges of slot resources that may be reserved by the nodes. Therefore, each node may perform slot assignment within respective range of slot resources according to the received slot assignment information.

In this embodiment, as a node receiving the slot assignment information, the method of this embodiment further includes:

step 406: receiving by the node the slot assignment information transmitted by its parent node, the slot assignment information including related information on a group where the node belongs to and a range of slot resources that may be reserved; and step 407: performing slot assignment by the node in a slot resource to which the group where the node belongs to corresponds according to the group.

In this embodiment, the sink node may select several one-hop subtrees from all the one-hop subtrees and take them as one group according to collision relationship by establishing the collision relationship in each one-hop subtree (the collision relationship indicating whether there exists collision when two nodes in two different one-hop subtrees transmit data at the same slot), several groups may be formed (spatially speaking), and such a process will last for several rounds (temporally speaking), until no one-hop subtree is left. In different groups at one round, slot assignment may be performed in each group itself, with no need of considering influences from other groups. According to the method of this embodiment, collision caused by two nodes reserving the same slot in two different groups is little. Therefore, slot assignment in the whole network is changed into independent slot assignment in several groups in several rounds, thereby solving the problem pointed out in the Background.

In this embodiment, although the steps executed by the node in the network in the process of slot assignment are illustrated in an order from step 401 to step 407, this embodiment is not limited to such an order in carrying out the method of this embodiment. In a concrete process of implementation, some auxiliary steps may be added as needed, or some steps may be omitted as needed, or orders of the execution of the steps may be adjusted as needed, etc., which are covered by the protection scope of the embodiment of the present invention without departing from the spirits of the embodiment of the present invention. For example, in some embodiments, the node may possibly receive detection request packets of other nodes first, and then transmit a detection request packet of itself, that is, steps 402-403 are executed first, and then step 401 is executed, or they are executed at the same time. For another example, for a leaf node in the network, as there exists no subnode, steps 404-405 need not to be executed.

With the method of this embodiment, slot assignment in a large wireless sensor network may be completed in several rounds. In one round, slots are only assigned for a part of the network. In one round, the part may be further divided into several groups, and slot assignment in these groups may be independent. In this way, not only storage cost for nodes is lowered (a size of a GTS table becomes smaller), but also slot assignment in one group becomes simpler (slot assignment in one group is independent, and the number of the nodes is small), and the network becomes easier in maintenance.

Embodiment 2

Figure 10:
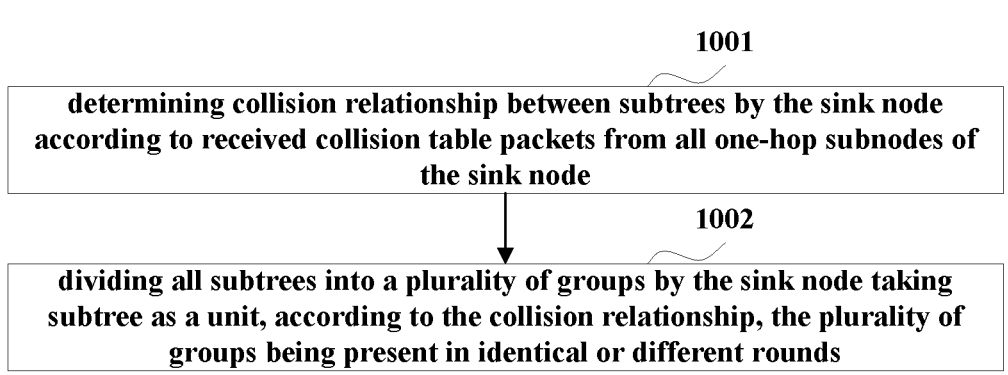
FIG. 10 is a flowchart of a slot assignment method based on partition of another embodiment of the present invention.

An embodiment of the present invention provides a slot assignment method based on partition. Wherein, the method is applicable to a sink node in a wireless network, such as in a multi-hop sensor network. FIG. 10 is a flowchart of the method. Referring to FIG. 10, the method includes:

step 1001: determining collision relationship between subtrees by the sink node according to received collision table packets from all one-hop subnodes of the sink node; and step 1002: dividing all subtrees into a plurality of groups by the sink node taking subtree as a unit, according to the collision relationship, the plurality of groups being present in identical or different rounds, so that each node performs slot assignment in a slot resource to which a group where the node belongs to corresponds.

In this embodiment, as described above, the sink node may group the one-hop subtrees according to the finally updated collision array. And the sink node may distinguish any two one-hop subtrees collision-free or not (collision of two one-hop subtrees means that if two nodes in the two one-hop subtrees reserve the same slot, collision possibly occurs).

In step 1001, the sink node establishes first a collision adjacency matrix according to the finally updated collision array. Table 1 is a schematic diagram of an implementation mode of the collision adjacency matrix. However, this embodiment is not limited thereto. As shown in Table 1, which one-hop subtrees in the network have collision and which one-hop subtrees have no collision may be determined from the collision adjacency matrix.

TABLE 1

|        | S1 | S2 | S3 | ... | Si | ... | Sn – 1 | Sn |
|--------|----|----|----|-----|----|-----|--------|----|
| S1     |    | 0  | 1  | ... | 0  | ... | 1      | 0  |
| S2     | 0  |    | 1  | ... | 0  | ... | 1      | 0  |
| S3     | 1  | 1  |    | ... | 0  | ... | 0      | 1  |
| ...    | ...| ...| ...|     | ...| ... | ...    | ...|
| Si     | 0  | 0  | 0  | ... |    | ... | 1      | 0  |
| ...    | ...| ...| ...| ... | ...|     | ...    | ...|
| Sn – 1 | 1  | 1  | 0  | ... | 1  | ... |        | 1  |
| Sn     | 0  | 0  | 1  | ... | 0  | ... | 1      |    |

Wherein, the meanings of the parameters in the array are as follows:

Si: the root ID of an i-th one-hop subtree, which may represent the one-hop subtree;

0: the two one-hop subtrees are collision-free (which may be in different groups at the same round); and 1: the two one-hop subtrees conflicting to each other (which may not be in different groups at the same round).

Furthermore, the number of nodes in the one-hop subtree Si may be denoted by ni.

In step 1002, the sink node may group all the one-hop subtrees according to the above collision relationship, so as to ensure that there exists no collision between one-hop subtrees in different groups at the same round. As to whether there exists collision between one-hop subtrees in the same group at the same round, it is not limited in this embodiment. Preferably, the numbers of the nodes in different groups at the same round are similar, so as to achieve more uniform slot assignment. Preferably, ranges of slot resources that can be disposed and used by groups in identical rounds are identical. And preferably, ranges of slot resources that can be disposed and used by groups in different rounds do not intersect, so as to achieve basically collision-free slot assignment.

Figure 11:
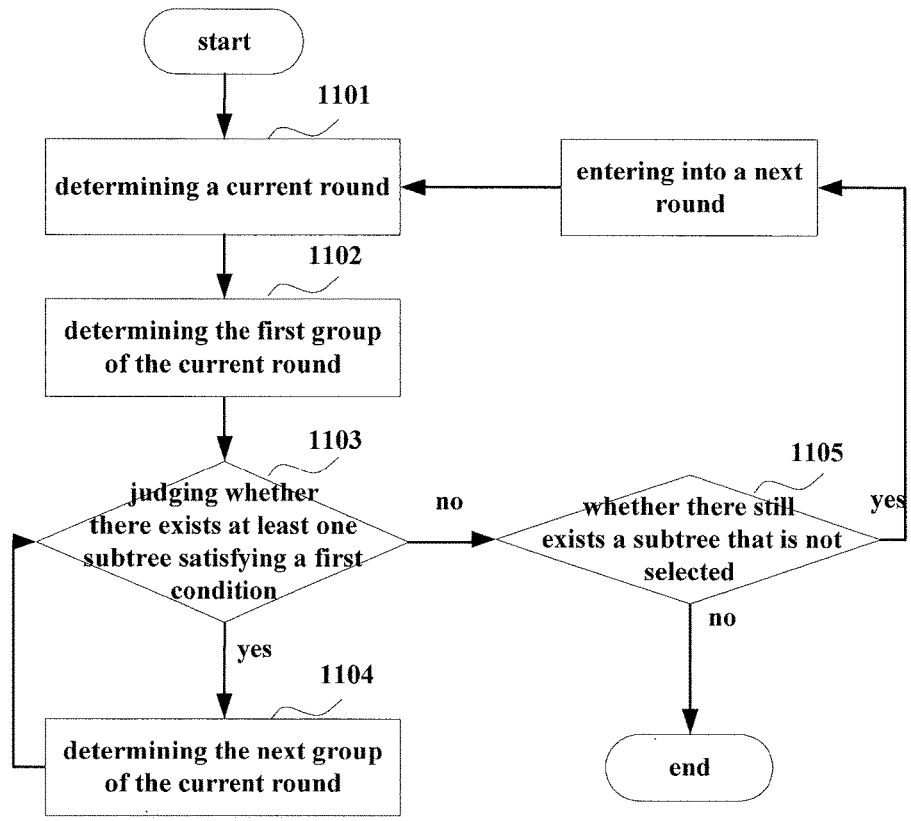
FIG. 11 is a flowchart of a method for grouping all one-hop subtrees by a sink node.

In an implementation mode of step 1002, the method of grouping all the one-hop subtrees by the sink node may be carried out by a method shown in FIG. 11. Referring to FIG. 11, the method includes:

step 1101: determining a current round;

step 1102: selecting a first predetermined number of subtrees from selectable subtrees as a first group of the current round according to a predetermined policy;

step 1103: judging whether there exists at least one subtree satisfying a first condition in remaining subtrees, the first condition referring to that the at least one subtree does not interfere with subtrees in all the other groups of the current round, and a difference between a sum of nodes of the at least one subtree and a sum of nodes of any one of the other groups of the current round is less than a first threshold; and executing step 1104 if yes; otherwise, executing step 1105;

step 1104: selecting a subtree for a next group of the current round from the remaining subtrees, and turning back to step 1103; and step 1105: judging whether there still exists a subtree that is not selected, entering into a next round if yes, and continuing with grouping of a next round, with a method of grouping being the same as that of the method of grouping of the current round, which shall not be described herein any further; and ending the processing if no.

In step 1104, the sink node may select a second predetermined number of subtrees from subtrees not interfering with subtrees in all the other groups of the current round as a next group of the current round, wherein a difference between a sum of nodes in the next group and a sum of nodes in the first group is less than the first threshold.

In an implementation mode of this embodiment, the sink node may select a subtree with a maximum number of nodes (i.e. a subtree with most nodes) from selectable subtrees as a first group of the current round, and select at least one subtree not interfering with subtrees in the first group of the current round as a second group of the current round, with a difference between a sum of nodes in the second group and a sum of nodes in the first group being less than a first threshold, that is, the numbers are equivalent. If there exists still a subtree that is not selected, grouping is continued in a next round according to the above-described method. That is, in this implementation mode, each round has at most two groups, the first group has only one subtree, and the subtree of the first group has a maximum number of nodes in all the selectable subtrees.

In another implementation mode of this embodiment, a subtree in a first group of each round is not limited to subtree with a maximum number of nodes, and is not limited to only one subtree.

In still another implementation mode of this embodiment, each round is not limited to having two groups, and there may be a plurality of groups; however, there exists no interference between the groups.

Figure 12:
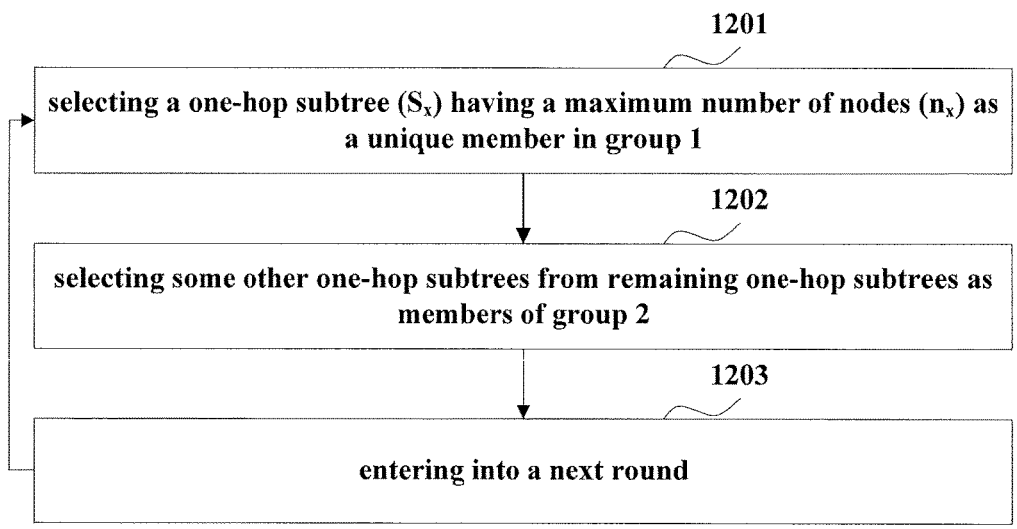
FIG. 12 is a flowchart of slot assignment of an implementation mode of an embodiment of the present invention.

The method of this embodiment shall be described below taking that there are only two groups in one round as an example. FIG. 12 is a flowchart of the method. Referring to FIG. 12, the flow includes:

step 1201: selecting a one-hop subtree (Sx) having a maximum number of nodes (nx) as a unique member in group 1;

step 1202: selecting some other one-hop subtrees from remaining one-hop subtrees as members of group 2, the selected one-hop subtrees (if there are any number of one-hop subtrees) needs to satisfy the following two conditions:

1) collision-free with Sx (denoted by 0 in the collision adjacency matrix); and 2) the total number of nodes in the selected one-hop subtree needs to be close to nx (so as to keep balance between the two groups); and step 1203: after the above two steps, the grouping in one round has been completed. The grouping of the next round begins and steps 1201 and 1202 are repeated in the remaining one-hop subtrees, until no one-hop subtree remains.

Figure 13:
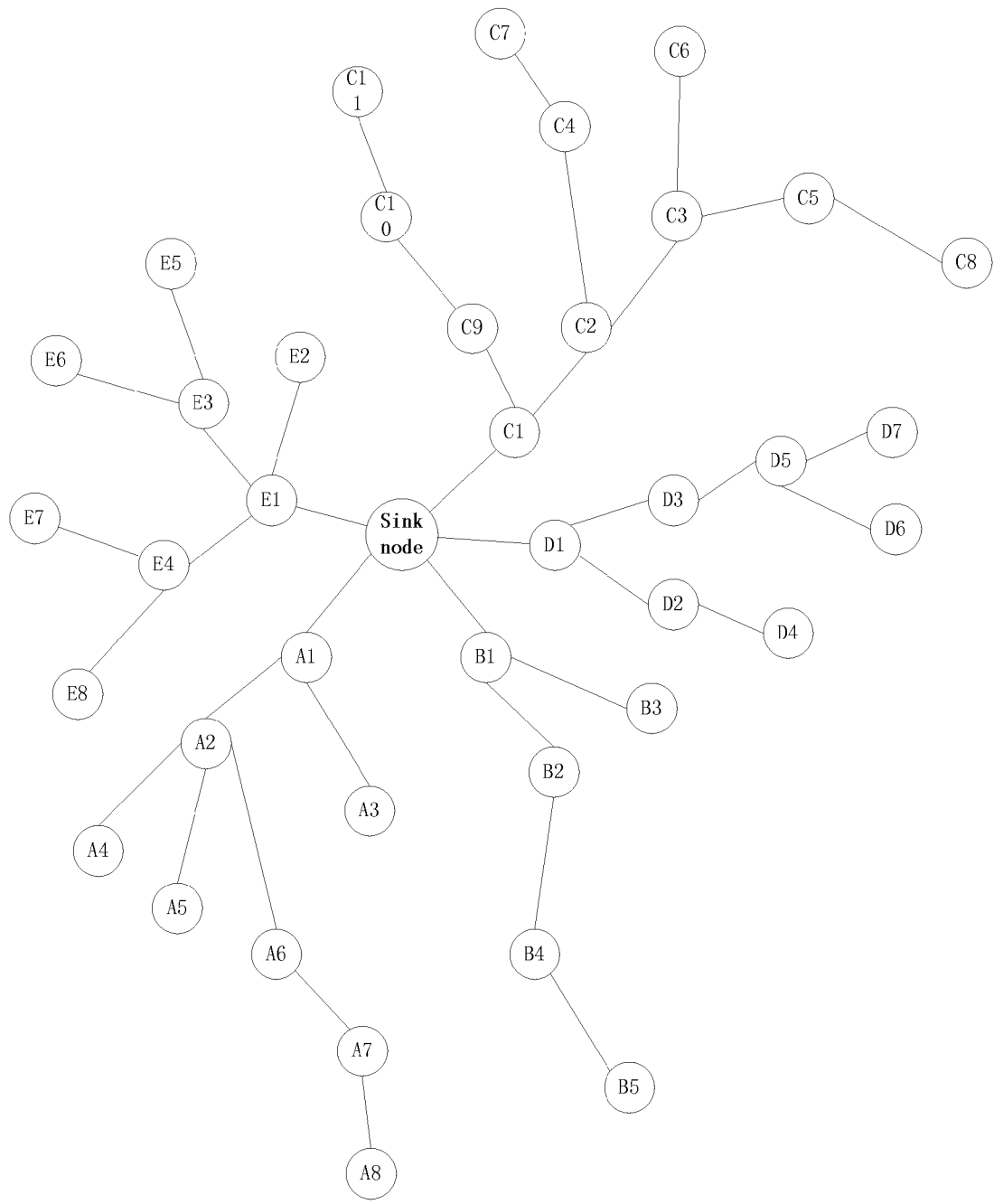
FIG. 13 is a schematic diagram of an embodiment of a wireless sensor network.
Figures 14, 15:
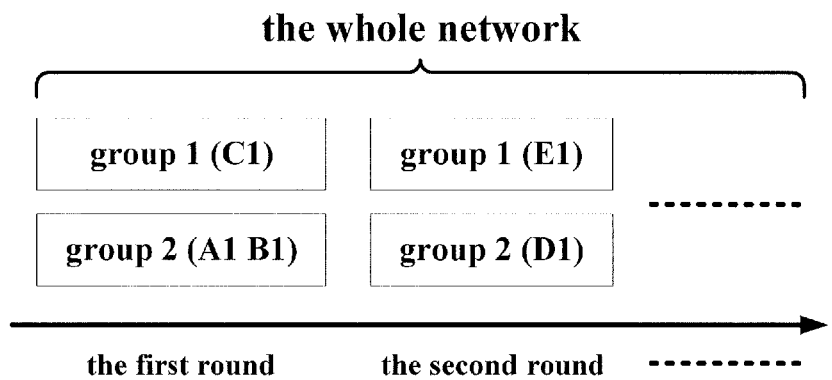
FIG. 14 is a schematic diagram of a collision adjacency matrix of one-hop subtrees in the wireless sensor network shown in FIG. 13.
FIG. 15 is a schematic diagram of a grouping result.

Grouping result of this embodiment is as shown in FIGS. 13-15. Wherein, FIG. 13 is a schematic diagram of an embodiment of a wireless sensor network. The wireless sensor network has five one-hop subtrees, which take nodes A1, B1, C1, D1 and E1 as roots, respectively, and are also referred to as a one-hop subtree A1, a one-hop subtree B1, a one-hop subtree C1, a one-hop subtree D1 and a one-hop subtree E1, respectively. FIG. 14 is a schematic diagram of a collision adjacency matrix of one-hop subtrees in the wireless sensor network shown in FIG. 13. In this example, as shown in FIG. 14, the one-hop subtree A1 collides with the one-hop subtrees B1, D1 and E1, the one-hop subtree B1 collides with the one-hop subtrees A1, D1, the one-hop subtree C1 collides with the one-hop subtrees D1, E1, the one-hop subtree D1 collides with the one-hop subtrees B1, C1, and the one-hop subtree E1 collides with the one-hop subtrees A1, C1. FIG. 15 is a schematic diagram of a grouping result. As shown in FIG. 15, a first round (round 1) has two groups, the first group (group 1) includes the one-hop subtree C1, and the second group (group 2) includes the one-hop subtrees A1 and B1; and a second round (round 2) has two groups, the first group (group 1) includes the one-hop subtree E1, and the second group (group 2) includes the one-hop subtree D1, and so on.

The example of FIG. 12 is illustrative only. As described above, this embodiment is not limited thereto. In a concrete implementation process, following methods of grouping are also feasible: 1) more than two groups are grouped at one round, only if there exists no collision between any two groups (there exists no collision between any one-hop subtree in one group and any one of one-hop subtrees in any other groups); 2) more than one one-hop subtree may be in one group, only if the numbers of the nodes in the groups are similar; and 3) the number of the nodes in one group is optional, and as described in step 1201, the selection of one-hop subtrees with a maximum number of the nodes is not necessary.

In this embodiment, after the grouping of the one-hop subtrees in the network finished, the sink node may transmit information on rounds and groups where root nodes of the subtrees belong to, and information on an available range of slot resources respectively to the root nodes of the one-hop subtrees (i.e. subnodes of the sink node), so that nodes in the subtrees perform slot assignment in respective groups accordingly; wherein, available ranges of slot resources of the groups of the rounds may be assigned by the sink node according to a predetermined policy, and this embodiment is not limited thereto.

Table 2 is an example of a GTS (guaranteed time slot) table of root nodes of one-hop subtrees assigned by the sink node. Of course, this table is exemplary only, and this embodiment is not limited thereto.

TABLE 2

| Root ID | Assigned slots |
|---------|----------------|
| ID 1    | s11, s12, . . . , s1l |
| ID 2    | s21, s22, . . . , s2m |
| ID 3    | s31, s32, . . . , s3n |
| . . .   | . . .          |

In this embodiment, after receiving the above information, the root nodes of the one-hop subtrees (i.e. subnodes of the sink node) in the network will transmit the information downwards level by level, so that nodes in the subtree where the root nodes belong to may complete slot assignment in their own groups according to the above received information.

In this embodiment, in order to avoid occurrence of collision in the sink node, the sink node needs to assign different slots for the root nodes (i.e. subnodes of the sink node) of the one-hop subtrees, so that the nodes complete slot assignment in their own groups. Taking the topology shown in FIG. 3 as an example, different slots need to be assigned for each root node (such as the nodes H, L and P in FIG. 3) of all the one-hop subtrees in the group.

Figure 16:
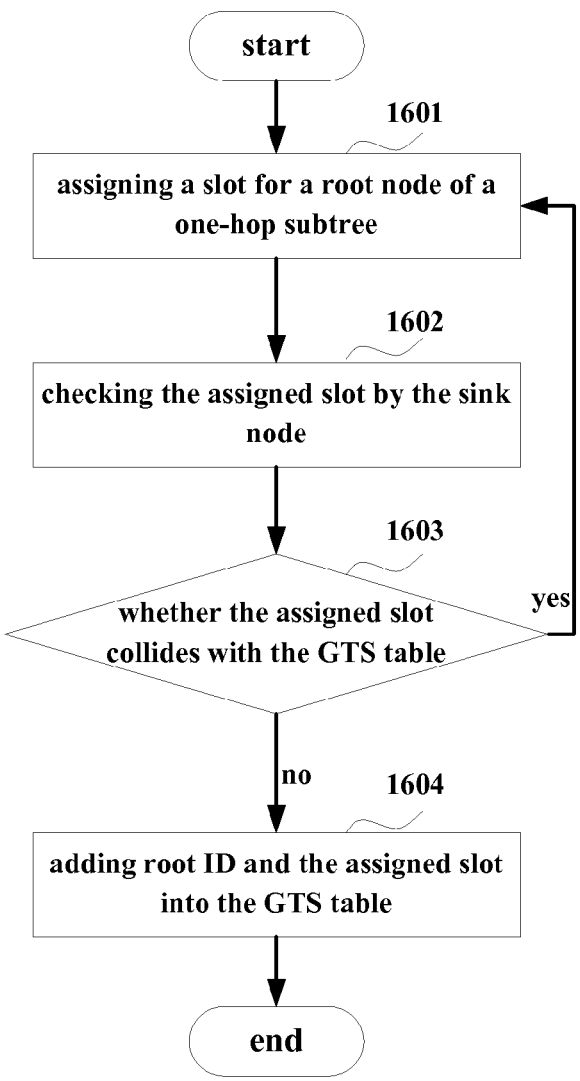
FIG. 16 is a schematic diagram of checking by a sink node whether slots assigned for root nodes of one-hop subtrees collide.

FIG. 16 is a schematic diagram of a process of checking a slot assigned for the root node of each one-hop subtree by the sink node according to the GTS (guaranteed time slot) table shown in Table 2. As shown in FIG. 16, the flow includes:

step 1601: assigning a slot for a root node of a one-hop subtree;

step 1602: checking the assigned slot by the sink node;

step 1603: judging whether the assigned slot collides with the GTS table, and turning back to step 1601 for re-assigning a slot for the root node of the one-hop subtree; otherwise, executing step 1604; and step 1604: adding root ID and the assigned slot into the GTS table.

In this embodiment, concrete slot assignment methods used by the nodes in different subtrees within the same group may be identical, and any existing slot assignment method may be used in one group. In this embodiment, concrete slot assignment methods used by the nodes in different subtrees within the different groups may be identical, and may also be different. However, it is preferred that the numbers of slots used in slot assignment methods in each group at one round are similar.

Figure 17:
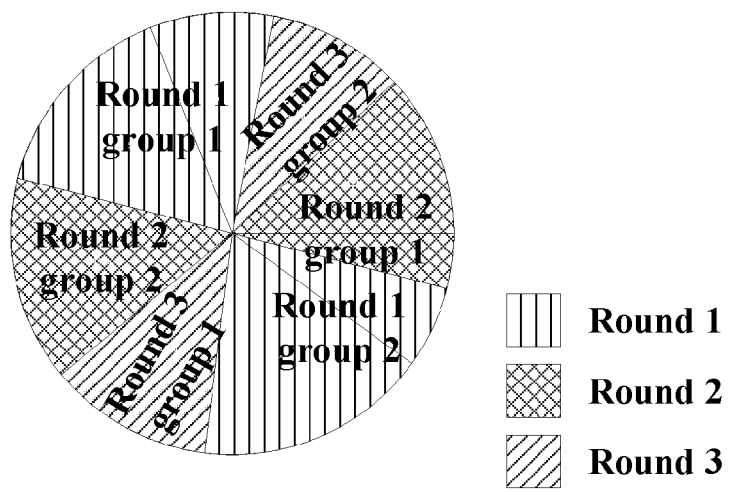
FIG. 17 is a schematic diagram of slot assignment.

FIG. 17 is a schematic diagram of an implementation mode of slot assignment performed according to the method of the embodiment. As shown in FIG. 17, in this implementation mode, all the one-hop subtrees in the network are divided into three rounds, there are several groups in each round, and there are one or more one-hop subtrees in each group.

With the method of this embodiment, slot assignment in a larger wireless sensor network may be completed in several rounds. In one round, slots are only assigned for a part of the network. In one round, the part may be further divided into several groups, and slot assignment in these groups may be independent. In this way, not only storage cost for nodes is lowered (a size of a GTS table becomes smaller), but also slot assignment in one group becomes simpler (slot assignment in one group is independent, and the number of the nodes is small), and the network becomes easier in maintenance.

An embodiment of the present invention further provides a node, as described in Embodiment 3 below. As the principle of the node for solving problems is similar to that of the method of Embodiment 1, the implementation of the method of Embodiment 1 may be referred to for the implementation of the node, and the identical contents shall not be described any further.

Embodiment 3

Figure 18:
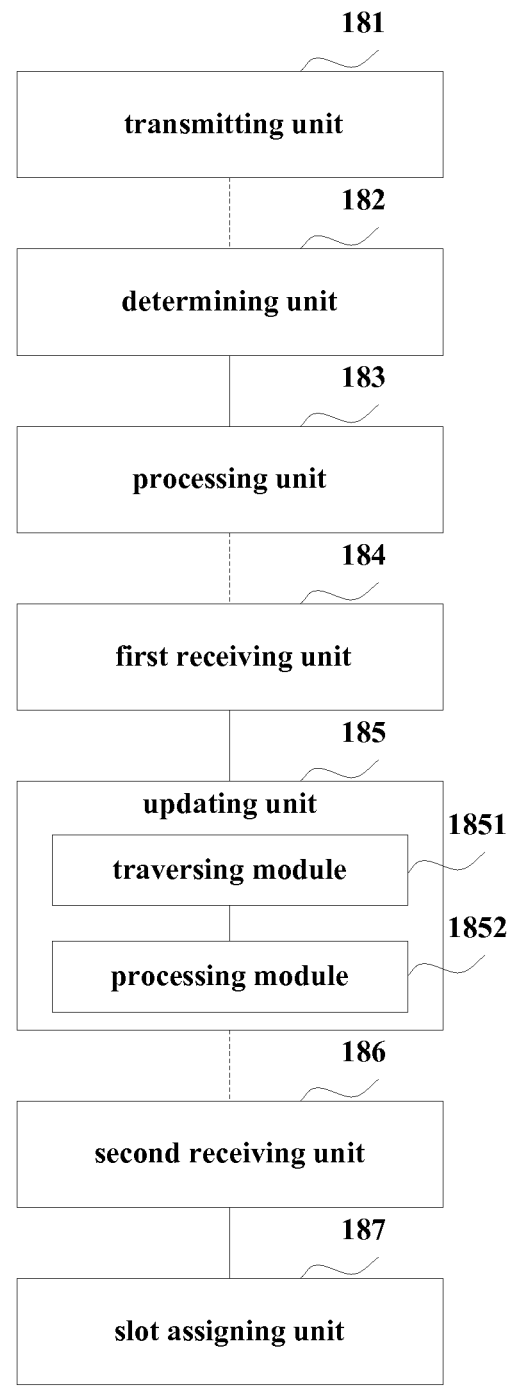
FIG. 18 is a schematic diagram of the structure of a common node (relative to a sink node) of an embodiment of the present invention.

An embodiment of the present invention provides a node. The node is one in a wireless network, such as a multi-hop sensor network. FIG. 18 is a schematic diagram of the structure of the node. Referring to FIG. 18, the node includes:

a transmitting unit 181 configured to transmit by broadcast a detection request packet including subtree information of a subtree where the node belongs to, the subtree taking a node one hop away from a sink node as a root node;

a determining unit 182 configured to determine whether other nodes and the node are in the same subtree according to received detection request packets including subtree information of subtrees where the other nodes belong to transmitted by the other nodes; and a processing unit 183 configured to store the subtree information of the subtrees where the other nodes belong to in a local collision table when the other nodes and the node are not in the same subtree, and transmit the local collision table to a parent node of the node.

In an implementation mode of this embodiment, the node further includes:

a first receiving unit 184 configured to receive collision table packets from all one-hop subnodes of the node; and an updating unit 185 configured to update the local collision table according to the received collision table packets, and transmit the updated local collision table to the parent node of the node.

In this implementation mode, the updating unit 185 includes:

a traversing module 1851 configured to traverse each piece of subtree information in each of the received collision table packets; and a processing module 1852 configured not to process the subtree information when the subtree information is included in the local collision table, and add the subtree information into the local collision table when the subtree information is not included in the local collision table.

In another implementation mode of this embodiment, the node further includes:

a second receiving unit 186 configured to receive slot assignment information transmitted by the parent node of the node, the slot assignment information including related information of a group where the node belongs to and a range of slot resources that can be reserved; and a slot assigning unit 187 configured to perform slot assignment in a slot resource to which the group where the node belongs to corresponds according to the group.

With the node of this embodiment, resource assignment is only performed in a range of slot resources of the group where the node belongs to. In this way, not only storage cost for nodes is lowered (a size of a GTS table becomes smaller), but also slot assignment in one group becomes simpler (slot assignment in one group is independent, and the number of the nodes is small), and the network becomes easier in maintenance.

An embodiment of the present invention further provides a node, as described in Embodiment 4 below. As the principle of the node for solving problems is similar to that of the method of Embodiment 2, the implementation of the method of Embodiment 2 may be referred to for the implementation of the node, and the identical contents shall not be described any further.

Embodiment 4

Figure 19:
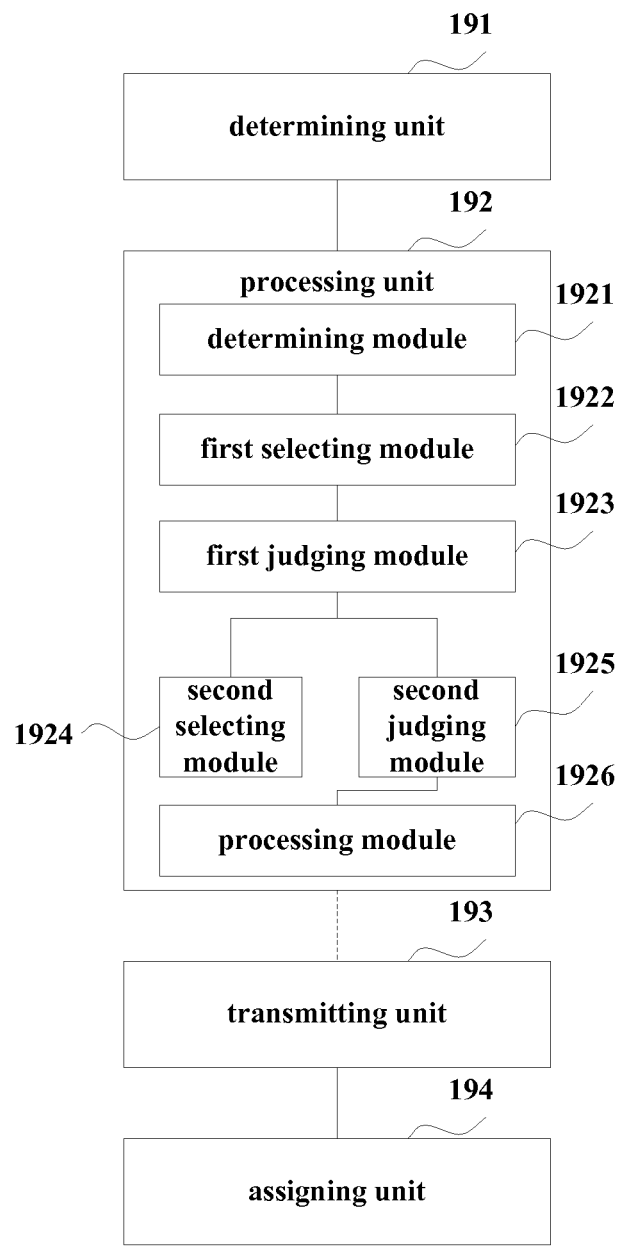
FIG. 19 is a schematic diagram of the structure of a sink node of an embodiment of the present invention.

An embodiment of the present invention provides a sink node. The sink node is one in a wireless network, such as a multi-hop sensor network; however, this embodiment is not limited thereto. FIG. 19 is a schematic diagram of the structure of the sink node. Referring to FIG. 19, the sink node includes:

a determining unit 191 configured to determine collision relationship between subtrees according to received collision table packets from all one-hop subnodes of the sink node; and a processing unit 192 configured to, taking subtree as a unit, divide all subtrees into a plurality of groups, according to the collision relationship, the plurality of groups being present in identical or different rounds, so that each node performs slot assignment in a slot resource to which a group where the node belongs to corresponds.

In this embodiment, ranges of slot resources that can be disposed and used by groups in identical rounds are identical, there exists no interference between nodes of groups in identical rounds, and ranges of slot resources that can be disposed and used by groups in different rounds do not intersect.

In an implementation mode of this embodiment, the processing unit 192 may include:

a determining module 1921 configured to determine a current round;

a first selecting module 1922 configured to select a first predetermined number of subtrees from selectable subtrees as a first group of the current round according to a predetermined policy;

a first judging module 1923 configured to judge whether there exists at least one subtree in remaining subtrees not interfering with subtrees in all the other groups of the current round, and a difference between a sum of nodes of the at least one subtree and a sum of nodes of any one of the other groups of the current round is less than a first threshold;

a second selecting module 1924 configured to select a subtree for a next group of the current round from the remaining subtrees when a judgment result of the first judging module 1923 is yes;

a second judging module 1925 configured to judge whether there still exists a subtree that is not selected when a judgment result of the first judging module 1923 is no; and a processing module 1926 configured to enter into a next round when a judgment result of the second judging module 1925 is yes, and end the processing when the judgment result of the second judging module 1925 is no.

In this implementation mode, the second selecting module 1924 may be configured to: select a second predetermined number of subtrees from subtrees not interfering with subtrees in all the other groups of the current round as a next group of the current round, wherein a difference between a sum of nodes in the next group and a sum of nodes in the first group is less than the first threshold.

In another implementation mode of this embodiment, the sink node may further include:

a transmitting unit 193 configured to transmit information on groups where root nodes of the subtrees belong to and information on an available range of slot resources respectively to root nodes of the subtrees, so that nodes in the subtrees perform slot assignment in respective groups accordingly.

In still another implementation mode of this embodiment, the sink node may further include:

an assigning unit 194 configured to assign different slots for the root nodes of the subtrees; and the transmitting unit 193 transmits the slots assigned by the assigning unit 194 for the root nodes of the subtrees to the root nodes of the subtrees.

With the sink node of this embodiment, all the one-hop subtrees are divided into groups, the groups being present in identical or different rounds, thereby making each node in the network perform resource assignment only in the range of slot resources of the group where it belongs to. In this way, not only storage cost for nodes is lowered (a size of a GTS table becomes smaller), but also slot assignment in one group becomes simpler (slot assignment in one group is independent, and the number of the nodes is small), and the network becomes easier in maintenance.

An embodiment of the present invention further provides a network; wherein the network includes at least one node as described in Embodiment 3 and the sink node as described in Embodiment 4.

An embodiment of the present invention further provides a wireless network, such as a multi-hop sensor network; wherein the wireless network includes at least one node as described in Embodiment 3, or includes at least one arbitrary combination of the nodes as described in Embodiment 3.

The above apparatus and method of the present invention may be implemented by hardware, or by hardware in combination with software. The present invention relates to such a computer-readable program that when the program is executed by a logic device, the logic device is enabled to carry out the apparatus or components as described above, or to carry out the methods or steps as described above. The present invention also relates to a storage medium for storing the above program, such as a hard disk, a floppy disk, a CD, a DVD, and a flash memory, etc.

The present invention is described above with reference to particular embodiments. However, it should be understood by those skilled in the art that such a description is illustrative only, and not intended to limit the protection scope of the present invention. Various variants and modifications may be made by those skilled in the art according to the spirits and principle of the present invention, and such variants and modifications fall within the scope of the present invention.

For the implementation of the present invention including the above embodiments, following supplements are further disclosed.

Supplement 1.

A slot assignment method based on partition, the method being applicable to other nodes than a sink node in a multi-hop sensor network and including:

transmitting by a node by broadcast a detection request packet including subtree information of a subtree where the node belongs to, the subtree taking a node one-hop away from the sink node as a root node;

determining by the node whether other nodes and the node are in the same subtree according to received detection request packets including subtree information of subtrees where the other nodes belong to transmitted by the other nodes; and storing the subtree information of the subtrees where the other nodes belong to in a local collision table by the node if the other nodes and the node are not in the same subtree, and transmitting the local collision table to a parent node of the node.

Supplement 2.

The method according to supplement 1, wherein the method further includes:

receiving collision table packets from all one-hop sub-nodes of the node by the node; and updating the local collision table by the node according to the received collision table packets, and transmitting the updated local collision table to the parent node of the node.

Supplement 3.

The method according to supplement 2, wherein the step of updating the local collision table by the node according to the received collision table packets includes:

traversing each piece of subtree information in each of the received collision table packets;

not processing the subtree information if the subtree information is included in the local collision table; and adding the subtree information into the local collision table if the subtree information is not included in the local collision table.

Supplement 4.

The method according to supplement 1, wherein the method further includes:

receiving by the node slot assignment information transmitted by its parent node, the slot assignment information including related information on a group where the node belongs to and a range of slot resources that may be reserved; and performing slot assignment by the node in a slot resource to which the group where the node belongs to corresponds according to the group.

Supplement 5.

A slot assignment method based on partition, the method being applicable to a sink node in a multi-hop sensor network and including:

determining by the sink node collision relationship between subtrees according to received collision table packets from all one-hop subnodes of the sink node; and dividing all subtrees into a plurality of groups, taking subtree as a unit, according to the collision relationship, the plurality of groups being present in identical or different rounds, so that each node performs slot assignment in a slot resource to which a group where the node belongs to corresponds.

Supplement 6.

The method according to supplement 5, wherein ranges of slot resources that can be disposed and used by groups in identical rounds are identical, there exists no interference between nodes of groups in identical rounds, and ranges of slot resources that can be disposed and used by groups in different rounds do not intersect.

Supplement 7.

The method according to supplement 5, wherein the step of dividing all subtrees into a plurality of groups includes:

determining a current round;

selecting a first predetermined number of subtrees from selectable subtrees as a first group of the current round according to a predetermined policy;

judging whether there exists at least one subtree not interfering with subtrees in all the other groups of the current round, in remaining subtrees, and a difference between a sum of nodes of the at least one subtree and a sum of nodes of any one of the other groups of the current round is less than a first threshold;

selecting a subtree for a next group of the current round from the remaining subtrees if yes, and turning back to the above step of judgment; and otherwise, judging whether there still exists a subtree that is not selected, entering into a next round if yes, and ending the processing if no.

Supplement 8.

The method according to supplement 7, wherein the step of selecting a subtree for a next group of the current round includes:

selecting a second predetermined number of subtrees from subtrees not interfering with subtrees in all the other groups of the current round as a next group of the current round, wherein a difference between a sum of nodes in the next group and a sum of nodes in the first group is less than the first threshold.

Supplement 9.

The method according to supplement 5, wherein the method further includes:

transmitting information on groups where root nodes of the subtrees belong to and information on an available range of slot resources respectively to the root nodes of the subtrees by the sink node, so that nodes in the subtrees perform slot assignment in respective groups accordingly.

Supplement 10.

The method according to supplement 9, wherein the method further includes:

assigning different slots by the sink node for the root nodes of the subtrees.

Supplement 11.

A node in a wireless network, including:

a transmitting unit configured to transmit by broadcast a detection request packet including subtree information of a subtree where the node belongs to, the subtree taking a node one hop away from a sink node as a root node;

a determining unit configured to determine whether other nodes and the node are in the same subtree according to received detection request packets including subtree information of subtrees where the other nodes belong to transmitted by the other nodes; and a processing unit configured to store the subtree information of the subtrees where the other nodes belong to in a local collision table when the other nodes and the node are not in the same subtree, and transmit the local collision table to a parent node of the node.

Supplement 12.

The node according to supplement 11, wherein the node further includes:

a first receiving unit configured to receive collision table packets from all one-hop subnodes of the node; and an updating unit configured to update the local collision table according to the received collision table packets, and transmit the updated local collision table to the parent node of the node.

Supplement 13.

The node according to supplement 12, wherein the updating unit includes:

a traversing module configured to traverse each piece of subtree information in each of the received collision table packets; and a processing module configured not to process the subtree information when the subtree information is included in the local collision table, and add the subtree information into the local collision table when the subtree information is not included in the local collision table.

Supplement 14.

The node according to supplement 11, wherein the node further includes:

a second receiving unit configured to receive slot assignment information transmitted by the parent node of the node, the slot assignment information including related information of a group where the node belongs to and a range of slot resources that can be reserved; and a slot assigning unit configured to perform slot assignment in a slot resource to which the group where the node belongs to corresponds according to the group.

Supplement 15.

A sink node in a wireless network, including:

a determining unit configured to determine collision relationship between subtrees according to received collision table packets from all one-hop subnodes of the sink node; and a processing unit configured to, taking subtree as a unit, divide all subtrees into a plurality of groups, according to the collision relationship, the plurality of groups being present in identical or different rounds, so that each node performs slot assignment in a slot resource to which a group where the node belongs to corresponds.

Supplement 16.

The sink node according to supplement 15, wherein ranges of slot resources that can be disposed and used by groups in identical rounds are identical, there exists no interference between nodes of groups in identical rounds, and ranges of slot resources that can be disposed and used by groups in different rounds do not intersect.

Supplement 17.

The sink node according to supplement 15, wherein the processing unit includes:

a determining module configured to determine a current round;

a first selecting module configured to select a first predetermined number of subtrees from selectable subtrees as a first group of the current round according to a predetermined policy;

a first judging module configured to judge whether there exists at least one subtree in remaining subtrees not interfering with subtrees in all the other groups of the current round, and a difference between a sum of nodes of the at least one subtree and a sum of nodes of any one of the other groups of the current round is less than a first threshold;

a second selecting module configured to select a subtree for a next group of the current round from the remaining subtrees when a judgment result of the first judging module is yes;

a second judging module configured to judge whether there still exists a subtree that is not selected when the judgment result of the first judging module is no; and a processing module configured to enter into a next round when a judgment result of the second judging module is yes, and end the processing when the judgment result of the second judging module is no.

Supplement 18.

The sink node according to supplement 17, wherein the second selecting module is configured to:

select a second predetermined number of subtrees from subtrees not interfering with subtrees in all the other groups of the current round as a next group of the current round, wherein a difference between a sum of nodes in the next group and a sum of nodes in the first group is less than the first threshold.

Supplement 19.

The sink node according to supplement 15, wherein the sink node further includes:

a transmitting unit configured to transmit information on groups where root nodes of the subtrees belong to and information on an available range of slot resources respectively to the root nodes of the subtrees, so that nodes in the subtrees perform slot assignment in respective groups accordingly.

Supplement 20.

The sink node according to supplement 19, wherein the sink node further includes:

an assigning unit configured to assign different slots for the root nodes of the subtrees; and the transmitting unit transmits the slots assigned by the assigning unit for the root nodes of the subtrees to the root nodes of the subtrees.

Supplement 21.

A network, wherein the network includes at least one node as described in any one of supplements 11-14 and the sink node as described in any one of supplements 15-20.

The invention claimed is:

1. A sink node in a wireless network, comprising:
a memory that stores a plurality of instructions; and
a processor coupled to the memory and configured to execute the plurality of instructions to:
    determine a collision relationship between subtrees according to received collision table packets from all one-hop subnodes of the sink node; and
    using a subtree as a unit, divide all subtrees into a plurality of groups, according to the collision relationship, the plurality of groups being present in one of identical and different rounds, where each node performs slot assignment in a slot resource to which a group where the node belongs to corresponds,
wherein in one round, slots are only assigned for a part of the wireless network, and
the processor is further configured to:
    determine a current round;
    select a first predetermined number of subtrees from selectable subtrees as a first group of the current round according to a predetermined policy;
    judge whether there exists at least one subtree in remaining subtrees not interfering with subtrees in all other groups of the current round, and a difference between a sum of nodes of the at least one subtree and a sum of nodes of any one of the other groups of the current round is within a predetermined range,
    select a subtree for a next group of the current round from the remaining subtrees when a judgment result of a first judging module is yes;
    judge whether there still exists a subtree that is not selected when the judgment result of the first judging module is no; and
    enter into a next round when a judgment result of a second judging module is yes, and end the processing when the judgment result of the second judging module is no.

2. The sink node according to claim 1, wherein ranges of slot resources that can be disposed and used by groups in identical rounds are identical, there exists no interference between nodes of groups in identical rounds, and ranges of slot resources that can be disposed and used by groups in different rounds do not intersect.

3. The sink node according to claim 1, wherein the processor is further configured to:
select a second predetermined number of subtrees from subtrees not interfering with subtrees in all the other groups of the current round as a next group of the current round, wherein a difference between a sum of nodes in the next group and a sum of nodes in the first group is within a predetermined range.

4. The sink node according to claim 1, wherein the sink node further comprises:
a transmitter configured to transmit information on groups where root nodes of the subtrees belong to and information on an available range of slot resources respectively to the root nodes of the subtrees, where nodes in the subtrees perform slot assignment in respective groups accordingly.

5. The sink node according to claim 4, wherein the processor is further configured to:
assign different slots for the root nodes of the subtrees; and the transmitter transmits the slots assigned by the processor for the root nodes of the subtrees to the root nodes of the subtrees.

6. A network, the network includes at least one node and a sink node, wherein a node from among the at least one node is configured to:
transmit by broadcasting a detection request packet including subtree information of a subtree to which the node belongs, the subtree using a node one hop away from a sink node as a root node;

determine whether other nodes and the node are in a same subtree according to received detection request packets including subtree information of subtrees to which the other nodes belong to transmitted by the other nodes; store the subtree information of the subtrees to which the other nodes belong in a local collision table when the other nodes and the node are not in the same subtree, and transmit the local collision table to a parent node of the node;

receive collision table packets from all one-hop subnodes of the node; and update the local collision table according to the received collision table packets, and transmit the local collision table that has been updated to the parent node of the node, the node is further configured to:

traverse each piece of subtree information in each of the collision table packets that have been received;

not process the subtree information when the subtree information is included in the local collision table, and add the subtree information into the local collision table when the subtree information is not included in the local collision table, receive slot assignment information transmitted by the parent node of the node, the slot assignment information including related information on a group to which the node belongs and a range of slot resources that can be reserved; and perform slot assignment in a slot resource to which the group where the node belongs to corresponds according to the group, and the sink node is configured to:

determine a collision relationship between subtrees according to received collision table packets from all one-hop subnodes of the sink node; and divide all subtrees into a plurality of groups using a subtree as a unit, according to the collision relationship, the plurality of groups being present in one of identical and different rounds, where each node performs slot assignment in a slot resource to which a group where the node belongs to corresponds, wherein in one round, slots are only assigned for a part of the network, and the sink node is further configured to determine a current round;

select a first predetermined number of subtrees from selectable subtrees as a first group of the current round according to a predetermined policy;

judge whether there exists at least one subtree in remaining subtrees not interfering with subtrees in all other groups of the current round, and a difference between a sum of nodes of the at least one subtree and a sum of nodes of any one of the other groups of the current round is within a predetermined range;

select a subtree for a next group of the current round from the remaining subtrees when a judgment result of a first judging module is yes;

judge whether there still exists a subtree that is not selected when the judgment result of the first judging module is no; and enter into a next round when a judgment result of a second judging module is yes, and end the processing when the judgment result of the second judging module is no.

* * * * *